US008064689B2

(12) United States Patent
Arai et al.

(10) Patent No.: US 8,064,689 B2
(45) Date of Patent: Nov. 22, 2011

(54) IMAGE PROCESSOR, IMAGE-PROCESSING METHOD, AND COMPUTER-READABLE MEDIUM

(75) Inventors: Shigeru Arai, Kanagawa (JP); Kazuo Asano, Kanagawa (JP); Toru Misaizu, Kanagawa (JP); Takeshi Saito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1000 days.

(21) Appl. No.: 11/939,061

(22) Filed: Nov. 13, 2007

(65) Prior Publication Data

US 2008/0310748 A1 Dec. 18, 2008

(30) Foreign Application Priority Data

Jun. 13, 2007 (JP) ................................ 2007-156889

(51) Int. Cl.
*G06K 9/00* (2006.01)
*G06K 9/40* (2006.01)

(52) U.S. Cl. ........ 382/162; 382/167; 382/252; 382/274; 382/275

(58) Field of Classification Search .................. 382/162, 382/164, 165, 167, 252, 274, 275
See application file for complete search history.

(56) References Cited

U.S. PATENT DOCUMENTS

2002/0051233 A1* 5/2002 Morimatsu .................. 358/456
2003/0231348 A1 12/2003 Ishii et al.
2005/0135673 A1* 6/2005 Mantell ........................ 382/162

FOREIGN PATENT DOCUMENTS

JP 2003348347 12/2003

* cited by examiner

*Primary Examiner* — Brian Le
(74) *Attorney, Agent, or Firm* — Gesmer Updegrove LLP

(57) ABSTRACT

An image processor has: a unit that executes a conversion process on input image data represented by pixels of M grayscales (M≧3), to convert the input data into output image data represented by sub-pixels of two grayscales; and a unit that outputs the output data, wherein the conversion process includes: a process to determine a filling pattern of sub-pixels corresponding to a pixel of interest of the input data according to a corrected grayscale value obtained by adding a correction value to a grayscale value of the pixel of interest; and the pattern includes a core pattern which forms a core of a dot and a growth pattern which grows a dot, the correction value includes a diffused error, and at least a part of the diffused error obtained by weighting an error of a pixel determined as the core pattern is not included in the correction value.

6 Claims, 9 Drawing Sheets

OBTAIN GRAYSCALE VALUE OF PIXEL OF INTEREST — S1
CALCULATE CORRECTION VALUE — S2
DETERMINE FILLING PATTERN — S3
CALCULATE ERROR OF PIXEL OF INTEREST — S4
SUPERPOSE DIFFUSED ERROR BY BLACK CORE PATTERN ON ERROR OF PIXEL OF INTEREST — S5
STORE FILLING PATTERN — S6
MOVE PIXEL OF INTEREST — S7

ERROR

| | | | | |
|---|---|---|---|---|
| 10 | 2 | −30 | 2 | −20 |
| 20 | 30 | 5 | 10 | 10 |
| 10 | −40 | P | | |

Fig. 3

DIFFUSION COEFFICIENT

| | | | | |
|---|---|---|---|---|
| 2/64 | 3/64 | 6/64 | 3/64 | 2/64 |
| 3/64 | 6/64 | 12/64 | 6/64 | 3/64 |
| 6/64 | 12/64 | P | | |

Fig. 4

FILLING PATTERN

| | | | | |
|---|---|---|---|---|
| 1 | 1 | 0 | 1 | 0 |
| 1 | 1 | 1 | 1 | 1 |
| 1 | 0 | P | | |

Fig. 5

IMAGE PROCESSOR, IMAGE-PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2007-156889 filed on Jun. 13, 2007.

BACKGROUND

1. Technical Field

The present invention relates to an image processor, an image-processing method, and a computer-readable medium.

2. Related Art

A technique to convert input image data represented by pixels of multiple values into image data represented by pixels of two values is known.

SUMMARY

According to an aspect of the present invention, there is provided an image processor having: a conversion unit that executes a predetermined conversion process on input image data represented by pixels of M grayscales (M≧3), to convert the input image data into output image data represented by sub-pixels of two grayscales and having a size smaller than the pixel; and an output unit that outputs the output image data obtained by the conversion unit, wherein the conversion process includes: a process to determine a filling pattern of a group of sub-pixels of the output image data corresponding to a pixel of interest of the input image data according to a corrected grayscale value obtained by adding a predetermined correction value to a grayscale value of the pixel of interest; and a process to calculate, as an error of the pixel of interest, an error between the corrected grayscale value and a grayscale value represented by the filling pattern, the filling pattern includes at least a core pattern in which a predetermined number of a plurality of sub-pixels are filled and which forms a core of a dot and a growth pattern in which a number of sub-pixels are filled, the number corresponding to the corrected grayscale value, and which grows an adjacent dot, the correction value is a value including a diffused error obtained by weighting an error of a peripheral pixel of the pixel of interest by an error diffusion coefficient, and at least a part of the diffused error obtained by weighting an error of a pixel, among the peripheral pixels, determined as the core pattern by the error diffusion coefficient is not included in the correction value and is allotted to proximate pixels of the pixel of interest including the pixel of interest.

BRIEF DESCRIPTION OF THE DRAWINGS

Exemplary embodiment of the present invention will be described in detail by reference to the following figures, wherein:

FIG. 3 is a diagram showing an example of errors of multiple peripheral pixels of a pixel of interest;

FIG. 4 is a diagram showing an example of error diffusion coefficients of multiple peripheral pixels of a pixel of interest;

FIG. 5 is a diagram showing an example of a filling pattern of multiple peripheral pixels of a pixel of interest;

DETAILED DESCRIPTION

An exemplary embodiment of the present invention will now be described with reference to the drawings.

Figure 1:
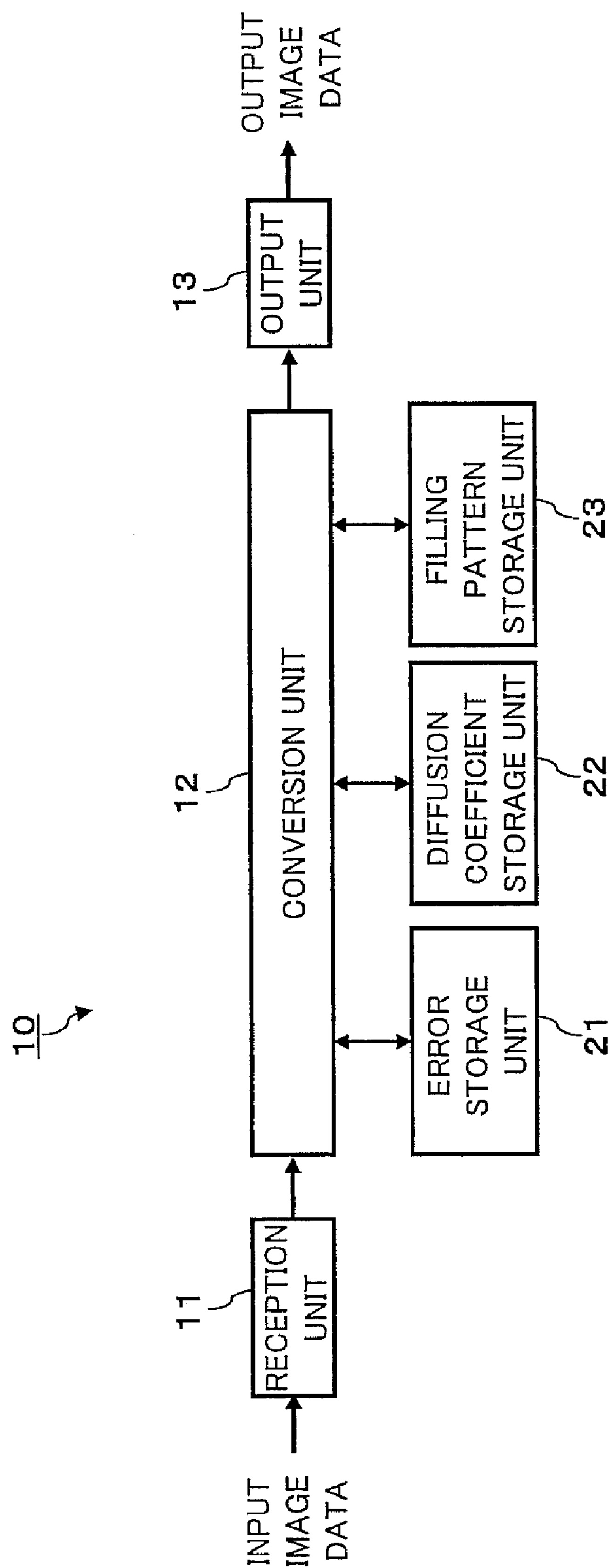
FIG. 1 is a block diagram showing a structure of an image processor according to an exemplary embodiment of the present invention.

FIG. 1 is a block diagram showing a structure of an image processor 10 according to an exemplary embodiment of the present invention. The image processor 10 converts input image data represented by pixels of M grayscales (M≧3) into output image data represented by sub-pixels of two grayscales and having a size smaller than the pixel.

In one configuration, the image processor 10 may be realized by cooperation of hardware and software resources. For example, functions of the image processor 10 may be realized by an image-processing program, recorded on a recording medium such as a ROM (Read Only Memory), being read into a main memory and executed by a CPU (Central Processing Unit). The image-processing program may be provided in a recorded form on a recording medium such as a CD-ROM or may be provided through communication as a data signal. In another configuration, the image processor 10 may be realized solely by hardware.

As shown in FIG. 1, the image processor 10 has a reception unit 11, a conversion unit 12, and an output unit 13.

The reception unit 11 receives input of input image data represented by pixels of M grayscales (M≧3). More specifically, the input image data include multiple pixels each having a grayscale value of M values. The input image data are also called image data represented by multiple values. The reception unit 11 receives input image data by means of, for example, a RAM (Random Access Memory).

The conversion unit 12 executes a predetermined conversion process on input image data received by the reception unit 11, to convert the input image data into output image data represented by sub-pixels of two grayscales and having a size smaller than the pixel of the input image data. The above-described predetermined conversion process will be described later in more detail.

The output unit 13 outputs the output image data obtained by the conversion unit 12 to the outside (other devices and software modules). For example, the output unit 13 outputs the output image data to the RAM.

A conversion process performed by the conversion unit 12 will now be described.

The conversion process performed by the conversion unit 12 includes: (a) a filling pattern determination process to determine a filling pattern of a group of sub-pixels of output image data corresponding to a pixel of interest of the input image data in accordance with a corrected grayscale value obtained by adding a predetermined correction value to the grayscale value of the pixel of interest; and (b) an error calculation process to calculate, as an error of the pixel of interest, an error between the corrected grayscale value and the grayscale value represented by the determined filling pattern.

Next, (a) the filling pattern determination process will be described in detail.

The "pixel of interest" is a pixel to be processed in the input image data. The pixels in the input image data are sequentially set as the pixel of interest. For example, in input image data in which pixels are arranged in a matrix form along a primary scan direction and a secondary scan direction, the pixel of interest is moved in a predetermined order along the primary scan direction and the secondary scan direction.

The "group of sub-pixels" is a collection of multiple sub-pixels corresponding to a pixel in input image data, and is, for example, multiple sub-pixels arranged in a matrix form.

The "filling pattern of a group of sub-pixels" is a pattern representing whether or not each sub-pixel in the group of sub-pixels is to be filled. The filled sub-pixel is also referred to as a colored sub-pixel, an ON sub-pixel, or a black sub-pixel, and is a sub-pixel having, for example, a grayscale value of "1". Meanwhile, the non-filled sub-pixel is also referred as a non-colored sub-pixel, an OFF sub-pixel, or a white sub-pixel, and is a sub-pixel, for example, having a grayscale value of "0". In the following description, the filled state will be referred to as "black" and the non-filled state will be referred to as "white".

The filling pattern includes at least a core pattern in which a predetermined multiple number of the sub-pixels are filled and which forms a core of a dot and a growth pattern in which a number of sub-pixels are filled, the number corresponding to the corrected grayscale value, and which grows an adjacent dot.

Because the above-described core pattern forms a core of the black dot, in the following description, this core pattern will be referred to as a "black core pattern". More specifically, the black core pattern is a pattern in which a predetermined number of sub-pixels at predetermined positions are filled and the other sub-pixels are not filled. The number and the positions of the sub-pixels to be filled in the black core pattern may be set, for example, in consideration of the reproducibility of the image and graininess in the printing process.

Because the above-described growth pattern grows an adjacent black dot, in the following description, this growth pattern will be referred to as a "black growth pattern". More specifically, the black growth pattern is a pattern in which one or more sub-pixels corresponding to a corrected grayscale value are filled and the other sub-pixels are not filled so that the size of an adjacent black dot is increased.

From the viewpoint of executing a superior process in a low-concentration region, the filling pattern may include an all-white pattern in which no sub-pixel is filled.

From the viewpoint of executing a superior process in a high-concentration region, the filling pattern may include a white core pattern for forming a core of a white dot and a white growth pattern for growing the white dot. The white core pattern is a pattern in which a predetermined multiple number of sub-pixels are not filled. More specifically, the white core pattern is a pattern in which a predetermined number of sub-pixels at predetermined positions are not filled and the other sub-pixels are filled. The white growth pattern is a pattern in which a number of sub-pixels are not filled, the number corresponding to the corrected grayscale value. More specifically, the white growth pattern is a pattern in which one or more sub-pixels corresponding to the corrected grayscale value are not filled and the other sub-pixels are filled so that the size of an adjacent white dot is increased.

From the viewpoint of executing a superior process in a high-concentration region, the filling pattern may include an all-black pattern in which all sub-pixels are filled.

A collection of a black sub-pixel of the black core pattern and a black sub-pixel of the black growth pattern forms a black dot, and a collection of a white sub-pixel of the white core pattern and a white sub-pixel of the white growth pattern forms a white dot. The collections are sometimes referred to as "clusters".

The "correction value" is a value including a diffused error obtained by weighting an error of a pixel at a periphery of a pixel of interest (hereinafter referred to as "peripheral pixel") by an error diffusion coefficient. Here, the error diffusion coefficient is a coefficient which is set on the basis of a relative position between the pixel of interest and the peripheral pixel, and, in one configuration, the error diffusion coefficient is set so that the weight is increased as the relative position of the peripheral pixel becomes closer to the pixel of interest. The error diffusion coefficient may be, for example, suitably determined in consideration of the reproducibility of an image or the like, and, thus, may be a coefficient which is used in an error diffusion process in the related art or a coefficient which is newly set.

If the errors of N ($N \geqq 1$) peripheral pixels $P_n$ (n=1, 2, . . . N) are $E_n$ (n=1, 2, . . . N) and the error diffusion coefficients corresponding to the peripheral pixels $P_n$ are $D_n$ (n=1, 2, . . . N), one error diffusion method is to simply set a weighted sum of the errors of the peripheral pixels as the correction value A' as shown in the following equation (1).

$$A' = \sum_{n=1}^{N} D_n \cdot E_n \tag{1}$$

In the above-described method, however, a negative error having a relatively large absolute value of a pixel determined to be a black core pattern may inhibit growth of the black dot in a low-concentration region.

In the exemplary embodiment, as compared with the above-described method, from the viewpoint of more easily growing the black dot; that is, from the viewpoint of promoting growth of the black dot, at least a part of the diffused error obtained by weighting the error of the pixel determined to be a black core pattern by the error diffusion coefficient is not included in the correction value.

In one configuration, none of the diffused error obtained by weighting the error of the pixel determined to be a black core pattern by the error diffusion coefficient is included in the correction value, from the viewpoint of simplifying the process. According to this configuration, for example, the correction value is a total of diffused errors obtained by weighting the errors of the peripheral pixels other than the pixel determined to be a black core pattern by the error diffusion coefficients.

In another configuration, a predetermined part of the diffused error obtained by weighting the error of the pixel determined to be the black core pattern by the error diffusion coefficient is included in the correction value and the remaining part is not included in the correction value. The predetermined part is, for example, an amount corresponding to a predetermined ratio. In this configuration, the correction value is, for example, a sum of a total of diffused errors obtained by weighting the errors of the peripheral pixels other than the pixel determined to be the black core pattern by the error diffusion coefficients and a total of a predetermined part of the diffused error obtained by weighting the error of the pixel determined to be the black core pattern by the error diffusion coefficients.

In the exemplary embodiment, the correction value A is represented by, for example, the following equation (2). In equation (2), $F_n$ (n=1, 2, . . . N) are coefficients corresponding to the peripheral pixels $P_n$ (n=1, 2, . . . N). $F_n$ is "1" for a pixel determined to be a filling pattern other than the black core pattern and is "0" or "a positive number less than 1" for a pixel determined to be the black core pattern.

$$A = \sum_{n=1}^{N} F_n \cdot D_n \cdot E_n \tag{2}$$

In the exemplary embodiment, from the viewpoint of maintaining a concentration over the entire image, among the diffused errors obtained by weighting the errors of the pixels determined to be the black core pattern by the error diffusion coefficients, a diffused error which is not included in the correction value is allotted to pixels proximate to the pixel of interest, including the pixel of interest.

In one configuration of the present invention, from the viewpoint of simplifying the process, the diffused error which is not included in the correction value is allotted only to the pixel of interest. In this configuration, for example, the diffused error which is not included in the correction value is superposed on the error of the pixel of interest. In other words, the diffused error which is not included in the correction value is added to the error between the corrected grayscale value of the pixel of interest and a grayscale value represented by the determined filling pattern, and the error thus obtained is set as the error of the pixel of interest.

The diffused error which is not included in the correction value may alternatively be allotted to one or multiple proximate pixels other than the pixel of interest or may be allotted to the pixel of interest and one or multiple proximate pixels other than the pixel of interest. Here, the proximate pixels other than the pixel of interest are unprocessed pixels.

When the diffused error which is not included in the correction value is to be allotted to the proximate pixels other than the pixel of interest, the diffused error which is not included in the correction value may be, for example, attached as an error of a pixel to which the diffused error is allotted; that is, an error diffused to peripheral pixels of the pixel in the error diffusion process, or may be added to the grayscale value of the pixel to which the diffused error is allotted.

A range of the proximity of the pixel of interest to which the diffused error is allotted is a range in which the advantage of easier growth of the dot can be obtained as compared with a case where all diffused errors are included in the correction value, and, more specifically, may be suitably determined in consideration of the quality of the image or the like. In one example configuration, the proximate pixels other than the pixel of interest are pixels adjacent to the pixel of interest.

Alternatively, the process to not include at least a part of the diffused error obtained by weighting the error of the pixel determined to be the black core pattern by the error diffusion coefficient and allot this part of the diffused error to the proximate pixels of the pixel of interest including the pixel of interest may be applied only in a predetermined grayscale region corresponding to a low-concentration region and not in the other grayscale regions. In other words, for the region other than the low-concentration region, all of the diffused error obtained by weighting the error of the pixel determined to be the black core pattern by the error diffusion coefficient may be included in the correction value. That is, the weighted sum of the errors of the peripheral pixels may be simply set as the correction value as described by the above-described equation (1).

The correction value may include a value other than the diffused error, and may be, for example, a value obtained by adding a random number to a value based on the diffused error.

Figure 2:
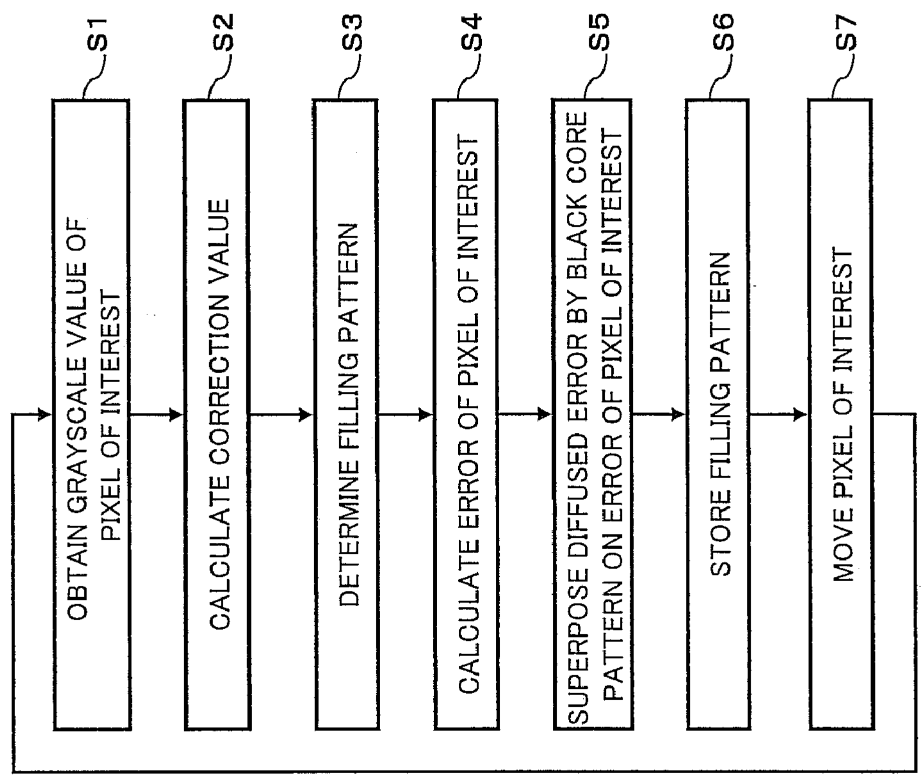
FIG. 2 is a flowchart showing an example of a conversion process in an exemplary embodiment of the present invention.

FIG. 2 is a flowchart showing an example of a conversion process in the exemplary embodiment. An example of the conversion process will now be described with reference to FIG. 2.

In FIG. 2, in step S1, the conversion unit 12 acquires a grayscale value Cin of a pixel of interest in the input image data. In the illustrated configuration, the input image data has 256 grayscales and the grayscale value is greater than or equal to 0 and less than or equal to 255.

In step S2, the conversion unit 12 calculates a correction value A. In the example configuration, the correction value A is calculated as follows.

As shown in FIG. 1, the image processor 10 has an error storage unit 21 which stores an error of each pixel, a diffusion coefficient storage unit 22 which stores an error diffusion coefficient, and a filling pattern storage unit 23 which stores a filling pattern corresponding to each pixel. The error storage unit 21 and the filling pattern storage unit 23 are, for example, line memories.

The conversion unit 12 calculates, as the correction value A, a sum of the diffused errors obtained by multiplying the errors of the peripheral pixels other than the pixel determined to be the black core pattern by the error diffusion coefficients based on the values stored in the storage units 21-23.

For example, when the errors of multiple peripheral pixels of the pixel of interest P are those shown in FIG. 3, the error diffusion coefficients for the multiple peripheral pixels of the pixel of interest P are those shown in FIG. 4, and the filling patterns for the multiple peripheral pixels of the pixel of interest P are those shown in FIG. 5, the correction value A is calculated as follows. In FIG. 5, a value of "0" represents a black core pattern and the value of "1" represents a filling pattern other than the black core pattern.

$$A = 10\times2/64+2\times3/64+2\times3/64+20\times3/64+30\times6/64+5\times12/64+10\times6/64+10\times3/64+10\times6/64 \approx 7.5$$

Referring again to FIG. 2, in step S3, the conversion unit 12 determines a filling pattern of a group of sub-pixels corresponding to the pixel of interest on the basis of a corrected grayscale value Ca (=Cin+A) obtained by adding the correction value A to the grayscale value Cin of the pixel of interest.

Figure 6:
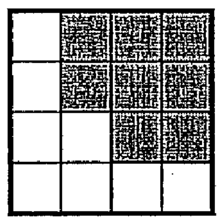
FIG. 6 is a diagram showing an example of a black core pattern.
Figure 7:
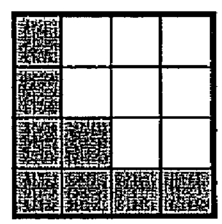
FIG. 7 is a diagram showing an example of a white core pattern.

In the exemplary embodiment, the filling pattern is determined as one of an all-white pattern, an all-black pattern, a black core pattern, a white core pattern, a black growth pattern, and a white growth pattern. The group of sub-pixels corresponding to a pixel of the input image data is a group of sub-pixels in a form of a 4×4 matrix. As shown in FIG. 6, the black core pattern is a pattern in which 8 sub-pixels at the bottom right corner among the group of sub-pixels are filled. As shown in FIG. 7, the white core pattern is a pattern in which 8 sub-pixels at the bottom right corner among the group of sub-pixels are not filled.

Figure 8:
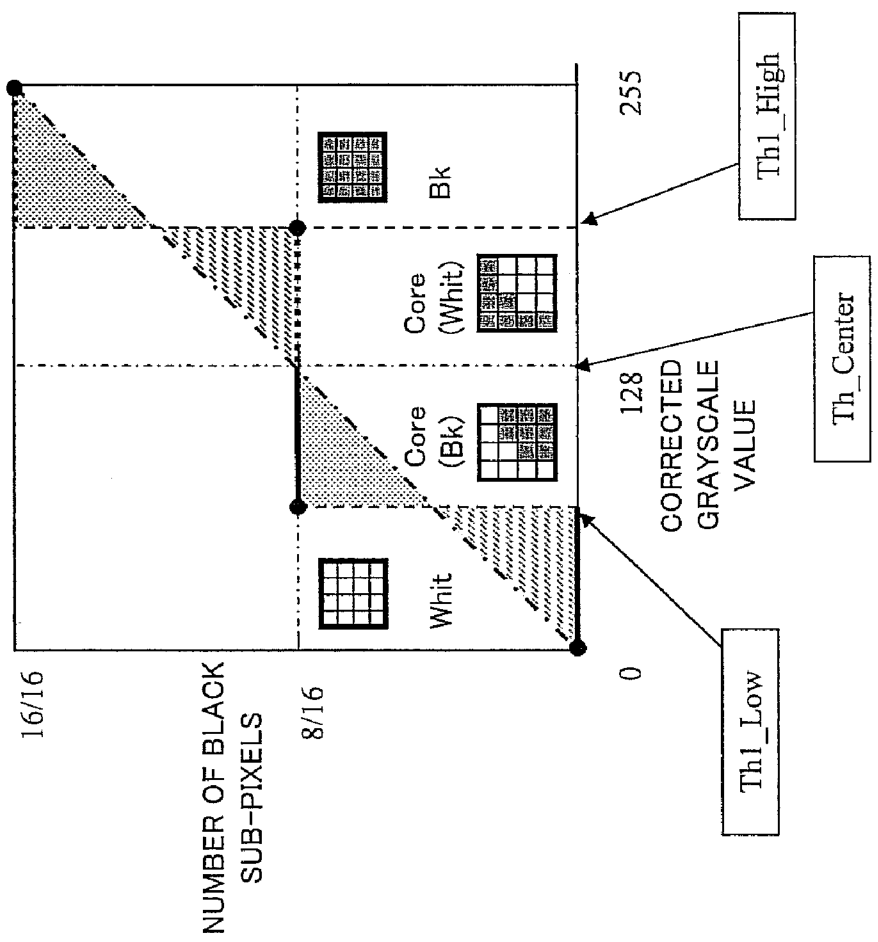
FIG. 8 is a diagram showing a first determination map.
Figure 9:
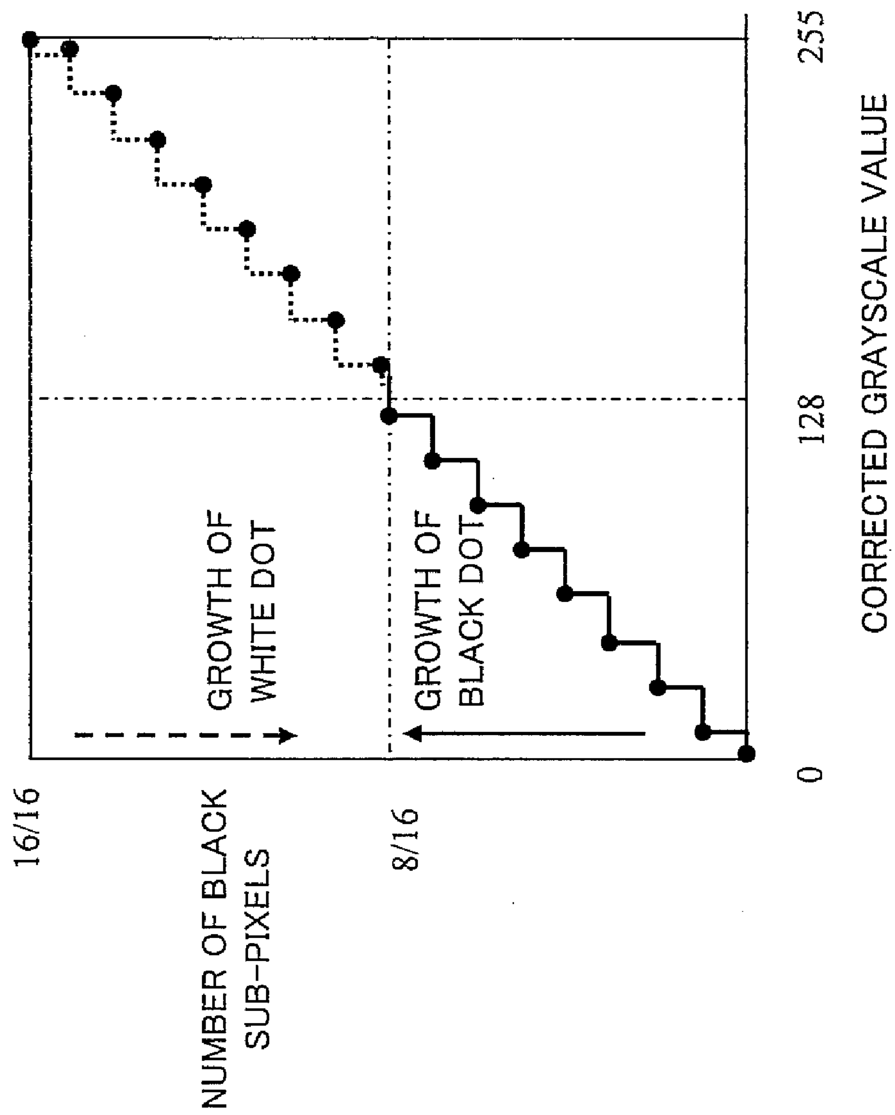
FIG. 9 is a diagram showing a second determination map.

In addition, in the exemplary embodiment, the filling pattern is determined in a manner described below on the basis of a first determination map shown in FIG. 8 and a second determination map shown in FIG. 9. In the following description, the processed pixels adjacent to the pixel of the interest and at the left, top, and upper left of the pixel of interest will be referred to as "reference pixels."

Figure 10:
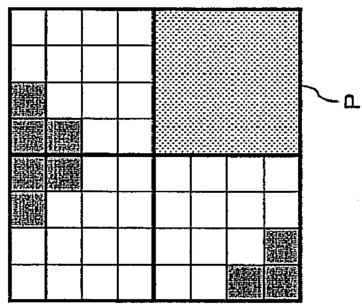
FIG. 10 is a diagram showing an example of a case where no black core pattern is present in three reference pixels adjacent to a pixel of interest.

When, as shown in FIG. 10, no black core pattern is present in the three reference pixels adjacent to the pixel of interest P, and the corrected grayscale value Ca of the pixel of interest P is greater than or equal to a lower threshold value Th1_Low and less than a center threshold value Th_Center, the filling pattern is determined to be the black core pattern.

When, as shown in FIG. 10, no black core pattern is present in the three reference pixels adjacent to the pixel of interest P, and the corrected grayscale value Ca is less than the lower threshold value Th1_Low, the filling pattern is determined to be the all-white pattern.

Figure 11:
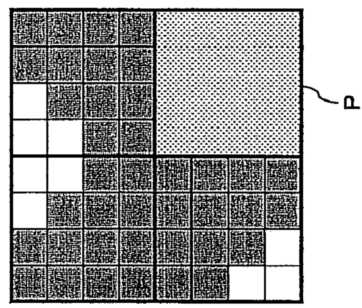
FIG. 11 is a diagram showing an example of a case where no white core pattern is present in three reference pixels adjacent to a pixel of interest.

When, as shown in FIG. 11, no white core pattern is present in the three reference pixels adjacent to the pixel of interest P, and the corrected grayscale value Ca of the pixel of interest P is greater than or equal to the center threshold value Th_Center and less than an upper threshold value Th1_-High, the filling pattern is determined to be the white core pattern.

When, as shown in FIG. 11, no white core pattern is present in the three reference pixels adjacent to the pixel of interest P, and the corrected grayscale value Ca is greater than or equal to the upper threshold value Th1_High, the filling pattern is determined to be the all-black pattern.

Figure 12:
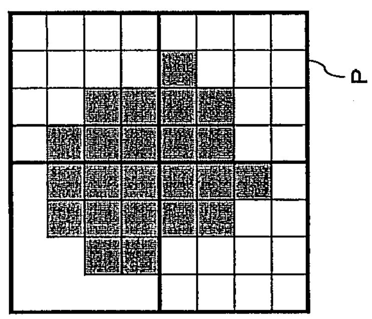
FIG. 12 is a diagram showing an example where a pixel of interest is converted to a black growth pattern when a black core pattern is present at the upper left of the pixel of interest.

When a black core pattern is present in any of the three reference pixels adjacent to the pixel of interest P and the corrected grayscale value Ca of the pixel of interest P is less than the center threshold value Th_Center, the filling pattern is determined to be the black growth pattern. The number of black sub-pixels to be filled is determined according to the second determination map of FIG. 9 and on the basis of the corrected grayscale value Ca, and is increased as the corrected grayscale value Ca increases. FIG. 12 shows an example in which the pixel of interest P is converted to the black growth pattern when a black core pattern is present at the upper left of the pixel of interest P.

Figure 13:
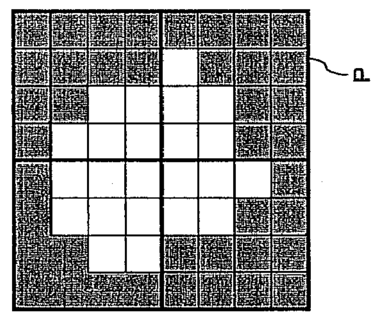
FIG. 13 is a diagram showing an example where a pixel of interest is converted to a white growth pattern when a white core pattern is present at the upper left of the pixel of interest.

When a white core pattern is present in any of the three reference pixels adjacent to the pixel of interest P and the corrected grayscale value Ca of the pixel of interest P is greater than or equal to the center threshold value Th_Center, the filling pattern is determined to be the white growth pattern. The number of white sub-pixels which are not filled is determined according to the second determination map of FIG. 9 and on the basis of the corrected grayscale value Ca, and is increased as the corrected grayscale value Ca decreases. FIG. 13 shows an example in which the pixel of interest P is converted to the white growth pattern when a white core pattern is present at the upper left of the pixel of interest P.

With reference again to FIG. 2, in step S4, the conversion unit 12 calculates an error E0 of the pixel of interest by subtracting the grayscale value represented by the filling pattern of the pixel of interest from the corrected grayscale value Ca of the pixel of interest. The grayscale value represented by the filling pattern is more specifically a grayscale value based on an area ratio of the black sub-pixels to the overall group of sub-pixels.

In the illustrated configuration of FIGS. 3-5, if the number of filling in the filling pattern of the pixel of interest P is k ($0 \leqq k \leqq 16$), the error E0 of the pixel of interest is $E0 = Ca - 16 \times k \approx (7.5 + Cin) - 16 \times k$.

Then, in step S5, the conversion unit 12 superposes, on the error ED of the pixel of interest obtained in step S4, the diffused error obtained by weighting the error of the peripheral pixel of the pixel of interest determined to be the black core pattern by the error diffusion coefficient.

More specifically, the conversion unit 12 calculates the error E of the pixel of interest by determining, from the values stored in the storage units 21-23, a total of the diffused errors obtained by multiplying the errors of the peripheral pixels of the pixel of interest determined to be the black core pattern by the error diffusion coefficients and adding the total of the diffused error to the error E0 of the pixel of interest. The conversion unit 12 stores the error E of the pixel of interest in the error storage unit 21.

In the illustrated configuration of FIGS. 3-5, the error E of the pixel of interest is $E = E0 + (-30 \times 6/64 - 20 \times 2/64 - 40 \times 12/64) \approx (7.5 + Cin) - 16 \times k + (-10.9)$.

Then, in step S6, the conversion unit 12 stores in the filling pattern storage unit 23 information indicating the filling pattern determined in step S3. More specifically, the conversion unit 12 stores a value of "0" when the filling pattern is determined to be the black core pattern in step S3 and stores a value of "1" otherwise.

Next, in step s7, the conversion unit 12 moves the pixel of interest, and returns the process to step S1.

As a comparative example, in the example of FIGS. 3 and 4, when the weighted sum of the errors of the peripheral pixels is to be simply set as the correction value as in equation (1), the correction value A' would be calculated as follows.

$$A' = 10 \times 2/64 + 2 \times 3/64 - 30 \times 6/64 + 2 \times 3/64 - 20 \times 2/64 + 20 \times 3/64 + 30 \times 6/64 + 5 \times 12/64 + 10 \times 6/64 + 10 \times 3/64 + 10 \times 6/64 - 40 \times 12/64 \approx -3.4.$$

The filling pattern is determined on the basis of the corrected grayscale value Ca' (=Cin+A'). When the number of filling in the filling pattern of the pixel of interest is k' ($0 \leqq k' \leqq 16$), the error E' of the pixel of interest is $E' = Ca' - 16 \times k' \approx (-3.4 + Cin) - 16 \times k'$.

Output image data shown at the right of FIG. 14 were obtained when input image data of multiple values representing a gradation image in which the concentration gradually changes from 0% to 50% were binarized by means of the image conversion process according to the exemplary embodiment described with reference to FIG. 2.

Figure 14:
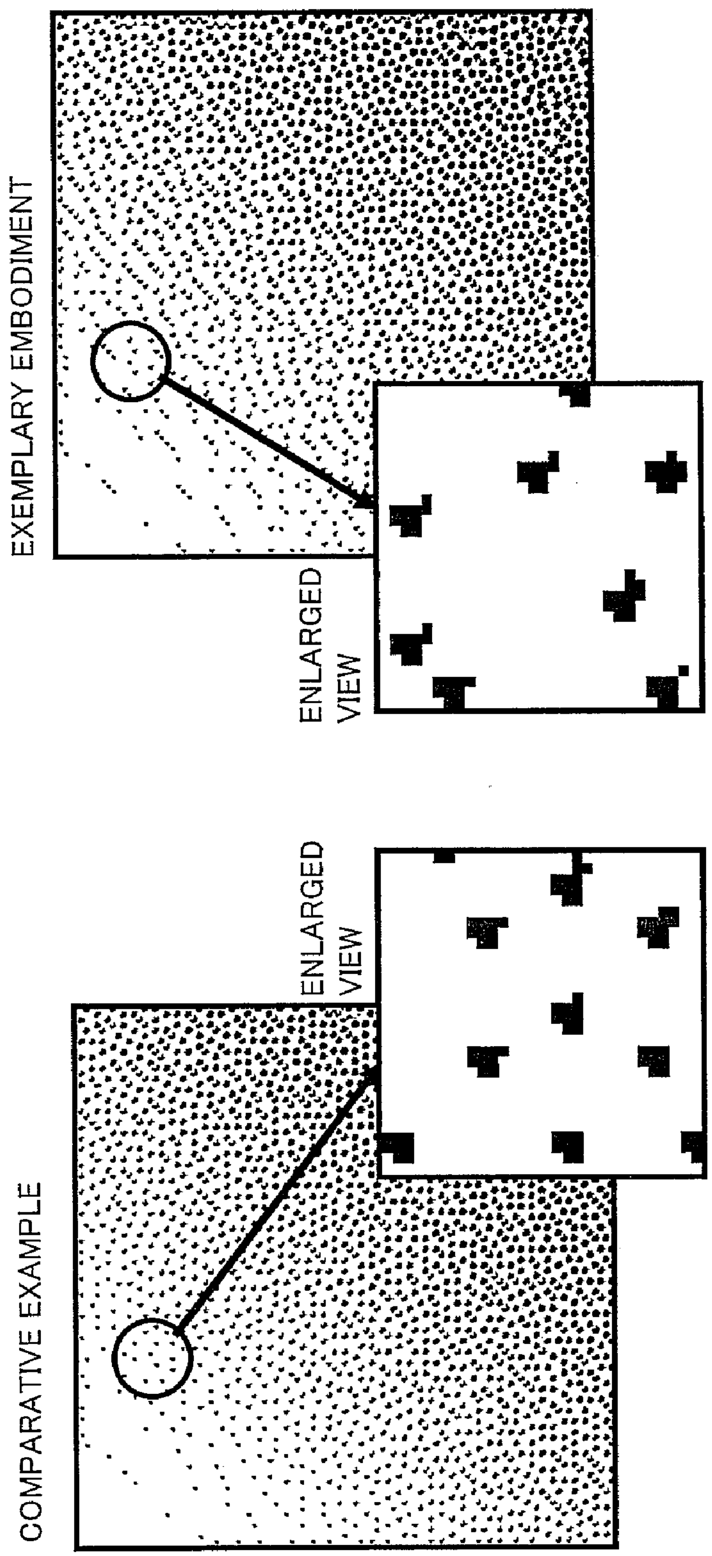
FIG. 14 is a diagram showing an example of results of binarization processes in an exemplary embodiment and in a comparative example.

In contrast, output image data shown at the left of FIG. 14 were obtained when input image data of multiple values representing the gradation image were binarized by means of an image conversion process of the above-described comparative example.

In FIG. 14, as compared with the image by the comparative example shown at the left, the image according to the exemplary embodiment shown at the right has a larger number of black sub-pixels, due to the black growth pattern added to the core of the black dot by the black core pattern, resulting in a larger black dot and a lower density of the black dot.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. An image processing system comprising:

a processor that executes a predetermined conversion process on input image data represented by pixels of M grayscales (M≧3), to convert the input image data into output image data represented by sub-pixels of two grayscales and having a size smaller than the pixel; and an output unit that outputs the output image data obtained from the processor, wherein the conversion process includes:

a process to determine a filling pattern of a group of sub-pixels of the output image data corresponding to a pixel of interest of the input image data according to a corrected grayscale value obtained by adding a predetermined correction value to a grayscale value of the pixel of interest; and a process to calculate, as an error of the pixel of interest, an error between the corrected grayscale value and a grayscale value represented by the filling pattern, the filling pattern includes at least a core pattern in which a predetermined number of a plurality of sub-pixels are filled and which forms a core of a dot and a growth pattern in which a number of sub-pixels are filled, the number corresponding to the corrected grayscale value, and which grows an adjacent dot, the correction value is a value including a diffused error obtained by weighting an error of a peripheral pixel of the pixel of interest by an error diffusion coefficient, and at least a part of the diffused error obtained by weighting an error of a pixel, among the peripheral pixels, determined as the core pattern by the error diffusion coefficient is not included in the correction value and is allotted to proximate pixels of the pixel of interest including the pixel of interest.

2. The image processing system according to claim 1, wherein none of the diffused error obtained by weighting the error of the pixel determined as the core pattern by the error diffusion coefficient is included in the correction value and all of the diffused error is allotted to the proximate pixels of the pixel of interest including the pixel of interest.

3. The image processing system according to claim 1, wherein at least a part of the diffused error obtained by weighting the error of the pixel determined as the core pattern by the error diffusion coefficient is allotted solely to the pixel of interest.

4. The image processing system according to claim 2, wherein at least a part of the diffused error obtained by weighting the error of the pixel determined as the core pattern by the error diffusion coefficient is allotted solely to the pixel of interest.

5. A method for converting image data, the method comprising:

executing, using a processor, a predetermined conversion process on input image data represented by pixels of M grayscales (M≧3), to convert the input image data into output image data represented by sub-pixels of two grayscales and having a size smaller than the pixel; and outputting the converted output image data, wherein the conversion process includes:

a process to determine a filling pattern of a group of sub-pixels of the output image data corresponding to a pixel of interest of the input image data according to a corrected grayscale value obtained by adding a predetermined correction value to a grayscale value of the pixel of interest; and a process to calculate, as an error of the pixel of interest, an error between the corrected grayscale value and a grayscale value represented by the filling pattern, the filling pattern includes at least a core pattern in which a predetermined number of a plurality of sub-pixels are filled and which forms a core of a dot and a growth pattern in which a number of sub-pixels are filled, the number corresponding to the corrected grayscale value, and which grows an adjacent dot, the correction value is a value including a diffused error obtained by weighting an error of a peripheral pixel of the pixel of interest by an error diffusion coefficient, and at least a part of the diffused error obtained by weighting an error of a pixel, among the peripheral pixels, determined as the core pattern by the error diffusion coefficient is not included in the correction value and is allotted to proximate pixels of the pixel of interest including the pixel of interest.

6. A non-transitory computer-readable medium storing a program causing a computer to execute a process for converting image data, the process comprising:

executing a predetermined conversion process on input image data represented by pixels of M grayscales (M≧3), to convert the input image data into output image data represented by sub-pixels of two grayscales and having a size smaller than the pixel; and outputting the converted output image data, wherein the conversion process includes:

a process to determine a filling pattern of a group of sub-pixels of the output image data corresponding to a pixel of interest of the input image data according to a corrected grayscale value obtained by adding a predetermined correction value to a grayscale value of the pixel of interest; and a process to calculate, as an error of the pixel of interest, an error between the corrected grayscale value and a grayscale value represented by the filling pattern, the filling pattern includes at least a core pattern in which a predetermined number of a plurality of sub-pixels are filled and which forms a core of a dot and a growth pattern in which a number of sub-pixels are filled, the number corresponding to the corrected grayscale value, and which grows an adjacent dot, the correction value is a value including a diffused error obtained by weighting an error of a peripheral pixel of the pixel of interest by an error diffusion coefficient, and at least a part of the diffused error obtained by weighting an error of a pixel, among the peripheral pixels, determined as the core pattern by the error diffusion coefficient is not included in the correction value and is allotted to proximate pixels of the pixel of interest including the pixel of interest.

* * * * *